J. K. HAWKINS.
BUTTER MERGER.
APPLICATION FILED JULY 18, 1918.
1,280,458.
Patented Oct. 1, 1918.
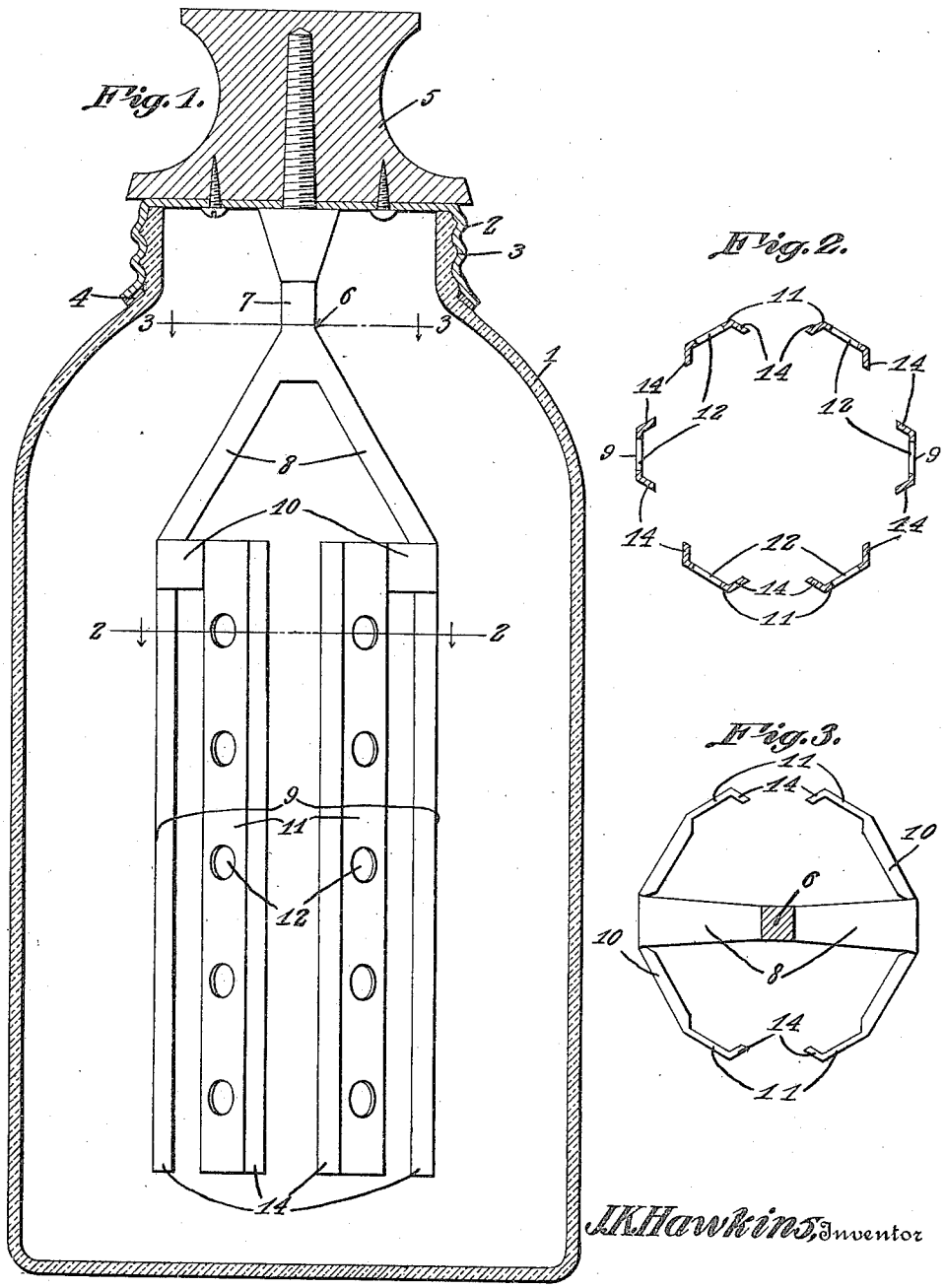

UNITED STATES PATENT OFFICE.

JOHN K. HAWKINS, OF MORRISTOWN, TENNESSEE.

BUTTER-MERGER.

1,280,458.  Specification of Letters Patent.  Patented Oct. 1, 1918.

Application filed July 18, 1918. Serial No. 245,534.

*To all whom it may concern:*

Be it known that I, JOHN K. HAWKINS, a citizen of the United States, residing at Morristown, in the county of Hamblen and State of Tennessee, have invented a new and useful Butter-Merger, of which the following is a specification.

The device forming the subject matter of this application is adapted to be employed for mixing butter with milk or cream, for the purpose of enabling the butter to go farther than would be the case if it were used unmixed, and the invention aims to provide a simple structure of the kind alluded to, wherein the beater is fixed relatively to the receptacle and is attached to the cap of the receptacle. Another object is to provide novel means for assembling the beater with the cap. A further object is to improve the construction of the beater so that the same will be peculiarly efficient in securing an agitation of the contents of the receptacle.

I have shown but one form of my invention, and a mechanic can make changes therein without departing from the spirit of the invention.

In the drawings:—Figure 1 is a longitudinal section of a butter merger embodying the invention, parts appearing in elevation; Fig. 2 is a cross section on the line 2—2 of Fig. 1; Fig. 3 is a cross section on the line 3—3 of Fig. 1.

In carrying out the invention there is provided a receptacle 1 which may be an ordinary glass fruit jar of the Mason type having a metal cap 2 threaded at 3 on the receptacle and sealed by a washer 4. A handle 5 in the form of a block, and made of wood if desired, is mounted on the cap 2. The numeral 6 marks a beater including a shank 7 having downwardly diverging arms 8 merging into depending central fingers 9. Cross pieces 10 are disposed at the lower ends of the arms 8 and are of arcuate form, there being depending outer fingers 11 at the ends of the cross pieces. The fingers 8 and 11 preferably are parallel and are disposed in a circle, the fingers having openings 12. The fingers 9 and 11 are provided with inwardly extended longitudinal flanges 14. The flanges 14 are disposed at an angle to the fingers, the shank 7 is rectangular in cross section, the arms 8 are rectangular in cross section, and the members 10 are rectangular in cross section. Owing to this construction, and because the openings 12 are provided, a plurality of edges are supplied, which work a thorough agitation. There may be as many fingers as desired, and the space between the lower ends of the fingers and the bottom of the receptacle may be regulated as is considered expedient. The shank 7 has a shoulder 15 which abuts against the under side of the cap 2, the shoulder carrying a threaded stem which extends upwardly through the cap 2 into the handle 5 to hold the same on the cap. The handle 5 may be held additionally on the cap 2 by means of securing devices, such as screws 17, passing upwardly through the cap and into the handle.

A quantity of butter and milk is placed in the receptacle 1 and the cap 2 is mounted on the receptacle, the beater 6 extending into the receptacle. When the receptacle is shaken in the hands of an operator, the beater 6, owing to its specific construction, will effect a merging of the milk and butter with a minimum amount of effort on the part of the manipulator.

Preferably, the milk is brought to a temperature of about 80 degrees Fahrenheit, and the butter is cut up and placed in the milk, in the receptacle. At the temperature mentioned, one pound of butter will mix properly with one and one half pints of milk.

I claim:—

1. In a butter merger, a receptacle; a removable cap on the receptacle; and a fixed beater comprising a shank assembled with the cap, diverging arms at the lower end of the shank, arcuate cross pieces at the lower ends of the arms, and fingers depending from the arms.

2. In a butter merger, a receptacle; a removable cap on the receptacle; and a fixed beater assembled with the cap and including arms disposed about an axis and of angular cross section.

3. In a butter merger, a receptacle; a removable cap on the receptacle; a handle superposed on the cap; and a fixed beater within the receptacle, the beater comprising a part passing through the cap and engaging the handle to hold the handle on the cap.

In testimony that I claim the foregoing as my own, I have hereto affixed my signature in the presence of two witnesses.

JOHN K. HAWKINS.

Witnesses:
L. A. HARMON,
L. D. HARMON.

Copies of this patent may be obtained for five cents each, by addressing the "Commissioner of Patents, Washington, D. C."